US005620272A

United States Patent [19]

Sheng

[11] Patent Number: 5,620,272

[45] Date of Patent: Apr. 15, 1997

[54] ADJUSTABLE JOINT ASSEMBLY FOR LADDER SECTIONS

[76] Inventor: Chim-Yuem Sheng, No. 38, Wen Hua S. Rd., Sanchung City, Taipei Hsien, Taiwan

[21] Appl. No.: 438,361

[22] Filed: May 10, 1995

[51] Int. Cl.[6] .................................................. F16C 11/00

[52] U.S. Cl. ................................ 403/96; 403/92; 403/84; 182/163

[58] Field of Search ................................ 182/163, 22, 27, 182/24; 403/98–101, 91–96, 84

[56] References Cited

U.S. PATENT DOCUMENTS 4,290,168 9/1981 Binge .................................... 403/96 X
4,407,045 10/1983 Boothe .................................. 182/22 X
4,602,889 7/1986 Mu-Shan .................................. 403/91
4,614,452 9/1986 Wang .................................... 403/97 X
5,219,240 6/1993 Kitamura .................................. 403/84
5,265,969 11/1993 Chuang ................................. 403/93 X
5,353,892 10/1994 Lu ........................................ 182/163

*Primary Examiner*—Daniel P. Stodola
*Assistant Examiner*—Emmanuel M. Marcelo
*Attorney, Agent, or Firm*—Bacon & Thomas

[57] ABSTRACT

The angle between adjacent ladder sections may be adjusted by a joint assembly having two base plates secured to the sections, wherein a locking rod extending through one base plate is selectively engageable within one of plural blind holes in the other base plate to maintain the base plates and sections at a desired angle. A locating plate maintains the locking rod in an unlocked position to permit the angle between the plates and sections to be adjusted by a single user.

1 Claim, 5 Drawing Sheets

ADJUSTABLE JOINT ASSEMBLY FOR LADDER SECTIONS

BACKGROUND OF THE INVENTION

The present invention relates to ladder joints for folding collapsible ladders, and relates more particularly to such a ladder joint which permits an operator to fold up or adjust the folding collapsible ladder conveniently without the assistance of another person.

U.S. Pat. No. 5,353,892 discloses a ladder joint for a folding collapsible latter which comprises a pivot, a first base plate and a second base plate respectively turned about the pivot, a spring-supported lever pivoted to the pivot, and a lock bolt inserted through an eccentric hole on the second base plate and controlled by the lever to engage into one of a series of eccentric holes on the first base plate. This known of ladder joint is functional, but still has drawbacks. One drawback of this structure is that it can only be adjusted among three different angles. Another drawback of this structure of is that the lever must be constantly depressed by hand so that the first and second base plates can be turned about the pivot relative to each other to adjust the angular position of the joint. Therefore, a single person cannot adjust the folding collapsible ladder without the assistance of another person.

SUMMARY OF THE INVENTIONS

The present invention eliminates the aforesaid drawbacks. According to one aspect of the present invention, a locating plate is fixed to the pivot shaft and includes a mounting hole loosely mounted on the locking rod. A torsional spring is mounted around the pivot shaft and includes one end engaging an end of the pivot shaft and an opposite end engaging a flange on the locating plate to provide bias to the locking rod through the locating plate, causing the locking rod to be forced into a selected eccentric blind hole on the first base plate. A retaining slot is provided on the locking rod for engagement with the periphery of the mounting hole on the locating plate when the locking rod is moved from the locking position to the unlocking position by the 1ever, causing the locking rod to be retained in the unlocking position for permitting the base plates to be turned relative to each other to change the angular position of the joint. According to another aspect of the present invention, the locating plate is made of symmetrical shape, therefore it can be installed with the locking rod in either direction to fit the left-handed operator or the right-handed operator.

DETAILED DESCRIPTION OF THE PREFERRED EMBODIMENT

Figure 1:
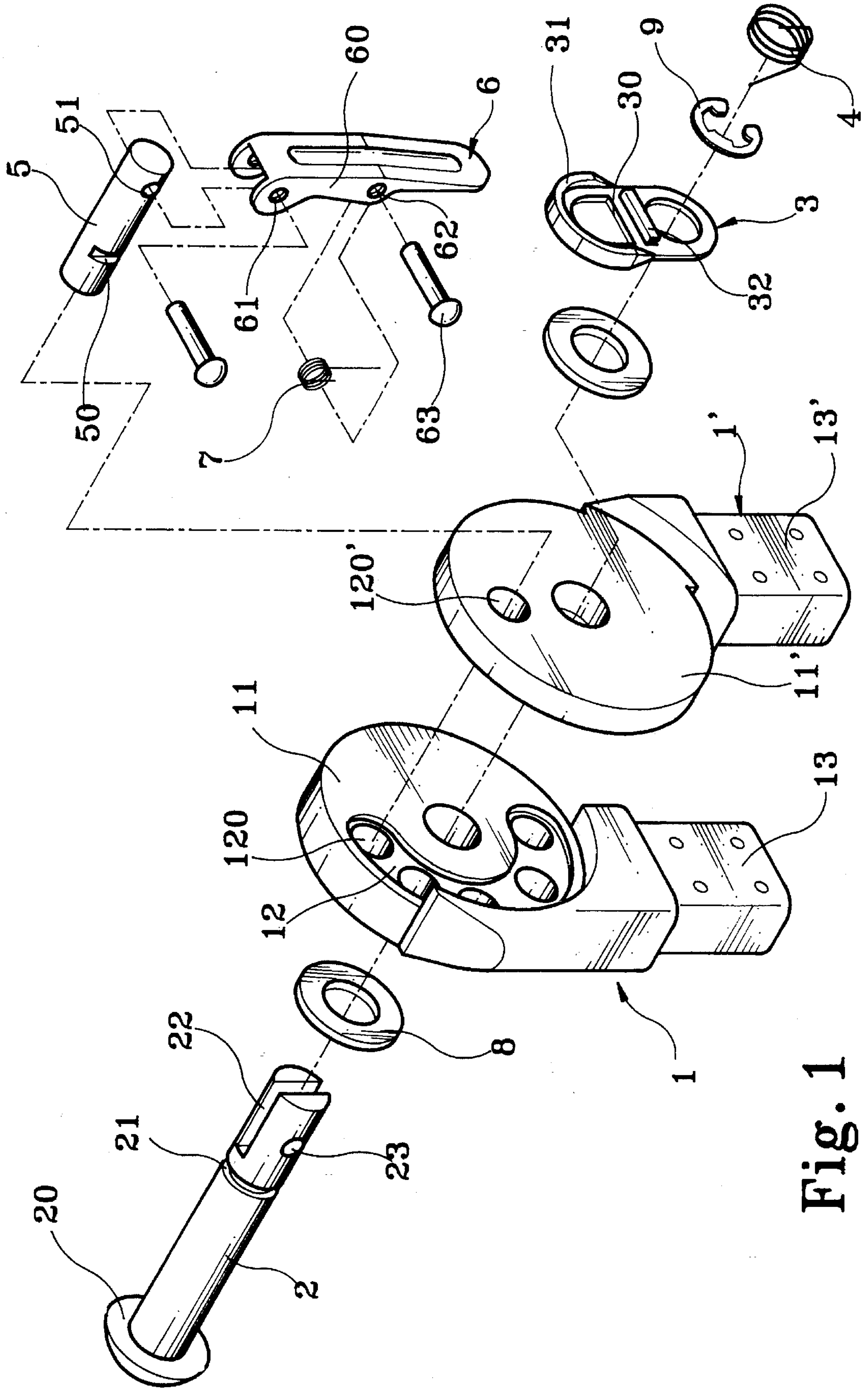
FIG. 1 is an exploded perspective view of a joint according to the present invention.
Figure 2:
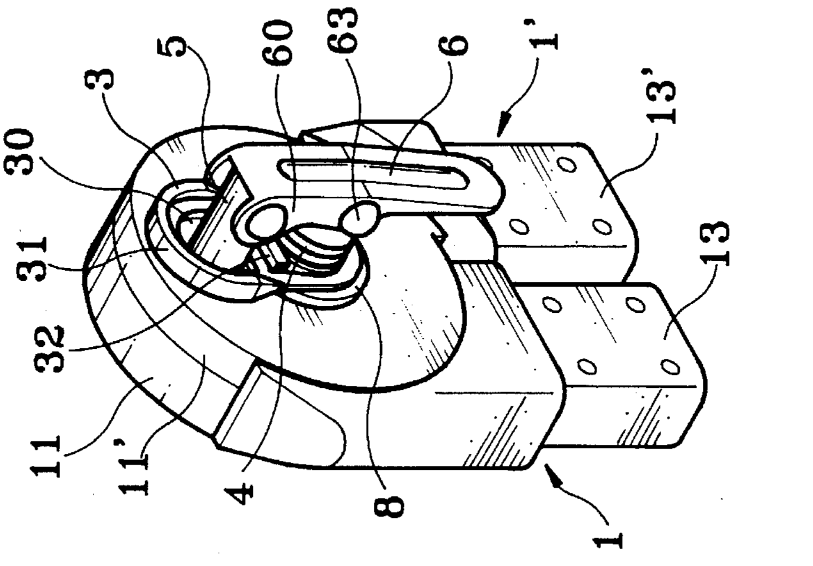
FIG. 2 is a perspective view of the joint shown in FIG. 1 in assembled form.
Figure 5:
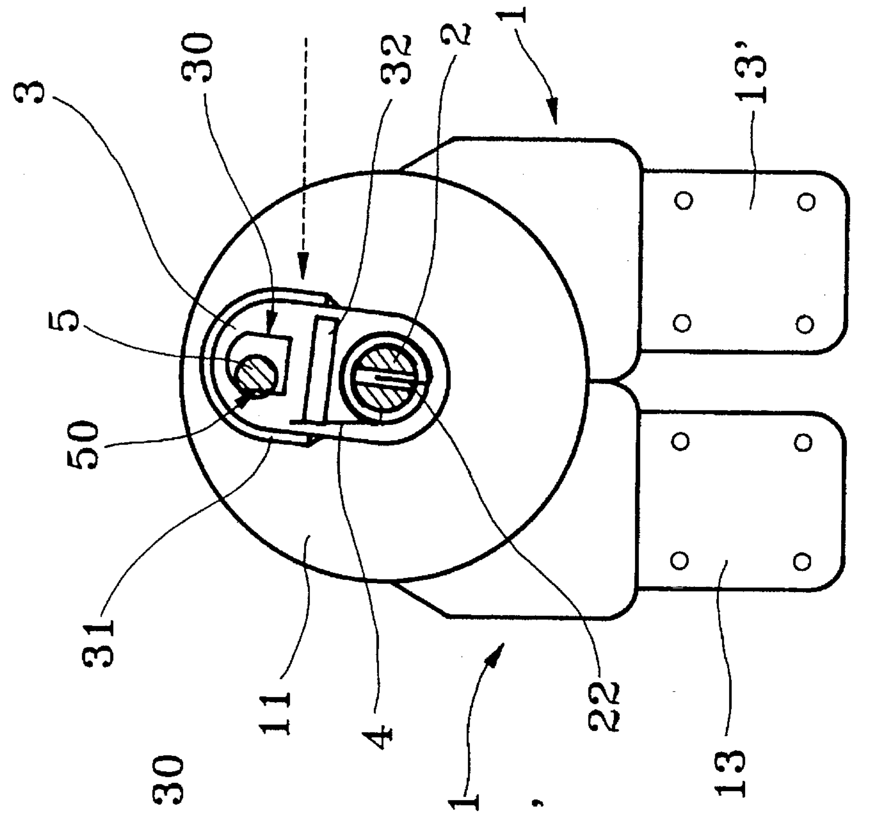
FIG. 5 is a sectional view taken along line V—V of FIG. 3B.
Figure 4:
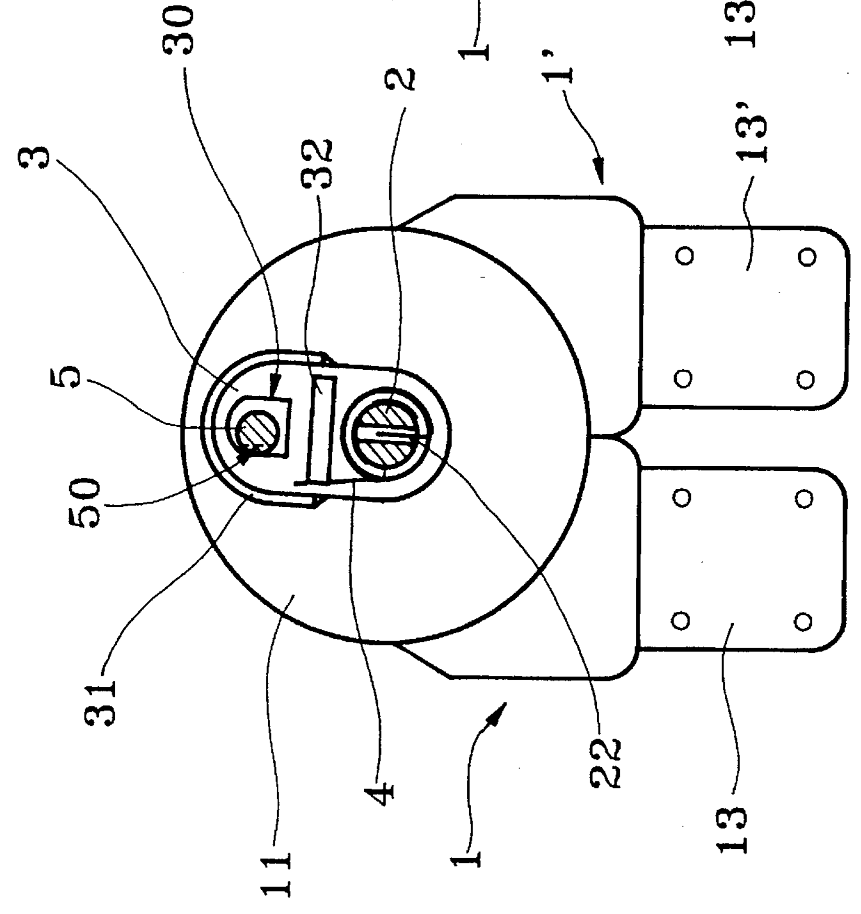
FIG. 4 is a sectional view taken along line IV—IV of FIG. 3A.
Figure 7:
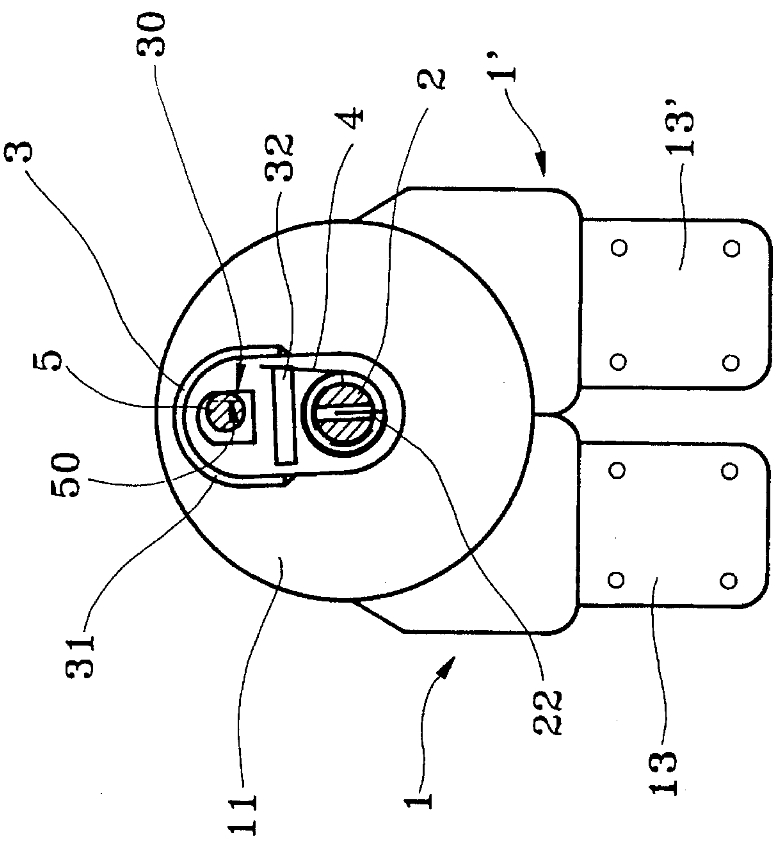
FIG. 7 is another front view of the joint shown in FIG. 2, showing the installation of the first torsional spring in the locating plate.
Figure 6:
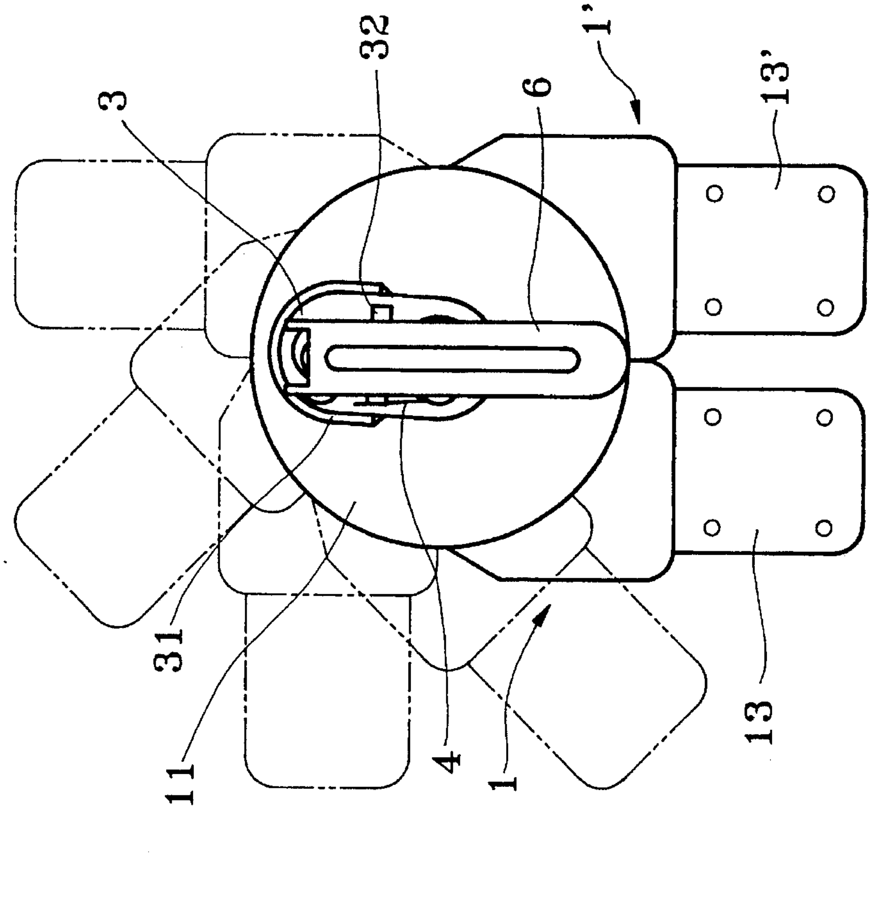
FIG. 6 is a front view of the joint shown in FIG. 2, showing movement positions of the base plates relative to each other.

Referring to FIGS. 1 and 2, a joint in accordance with the present invention is generally comprised of a first base plate 1, a second base plate 1', a pivot shaft 2, a locating plate 3, a first torsional spring 4, a lever 6, a second torsional spring 7, and a locking rod 5. The base plate 1 or 1' has one end terminating in a coupling disk 11 or 11' mounted around the pivot shaft 2, and an opposite end terminating in a mounting portion 13 or 13' fixed to a respective ladder section. The coupling disk 11 of the first base plate 1 has an arched sliding groove 12 at an inner side along the border, and a series of eccentric blind holes 120 within the arched sliding groove 12. The coupling disk 11' of the second base plate 1' has an eccentric through hole 120' corresponding to the eccentric blind holes 120 on the coupling disk 11 of the first base plate 1. The locking rod 5 is inserted through the eccentric through hole 120' on the coupling disk 11' of the second base plate 1' into a selected one of eccentric blind holes 120 on the coupling disk 11 of the first base plate 1 to maintain the first base plate 1 in the desired angular position relative to the second base plate 1'. The pivot shaft 2 has a head 20 at one end, a longitudinal split 22 at an opposite end, an annular groove 21 around the periphery adjacent to the longitudinal split 22, and a radial pivot hole 23 intersecting the longitudinal split 22. A washer 8 is mounted around the pivot shaft 2 and maintained between the head 20 of the pivot shaft 2 and the coupling disk 11 of the first base plate 1. The locating plate 3 is mounted around the pivot shaft 2 and retained in place by a clamp 9, which is fastened to the annular groove 21 on the pivot shaft 2. Plate 3 has a mounting hole 30, which receives the locking rod 5, a finger strip 31 around the mounting hole 30, and a flange 32 adjacent to the mounting hole 30 remote from the finger strip 31. The first torsional spring 4 is mounted around the pivot shaft 2, having one end stopped at the flange 32 on the locating plate 3 and an opposite end inserted into the longitudinal split 22 on the pivot shaft 2. Therefore, the first torsional spring 4 gives a torsional force to the locating plate 3, causing the locating plate 3 to be turned rightwards toward the locking rod 5. The lever 6 has two corrugated parallel walls 60 at two opposite sides, two pairs of pivot holes, namely, the front pair of pivot holes 61 and the rear pair of pivot holes 62 on the parallel walls 60. The front pair of pivot holes 61 are pivotably connected to one end of the locking rod 5 by a pivot. The rear pair of pivot holes 62 are pivotably connected to the pivot hole 23 on the pivot shaft 2 by a pivot 63. The locking rod 5 has a pivot hole 51 at one end pivotably connected between the front pair of pivot holes 61 on the lever 6 by a pivot, and a retaining slot 50 in the middle around the periphery for engagement with the periphery of the mounting hole 30 on the locating plate 3. The second torsional spring 7 is mounted around the pivot 63.

Figure 3B:
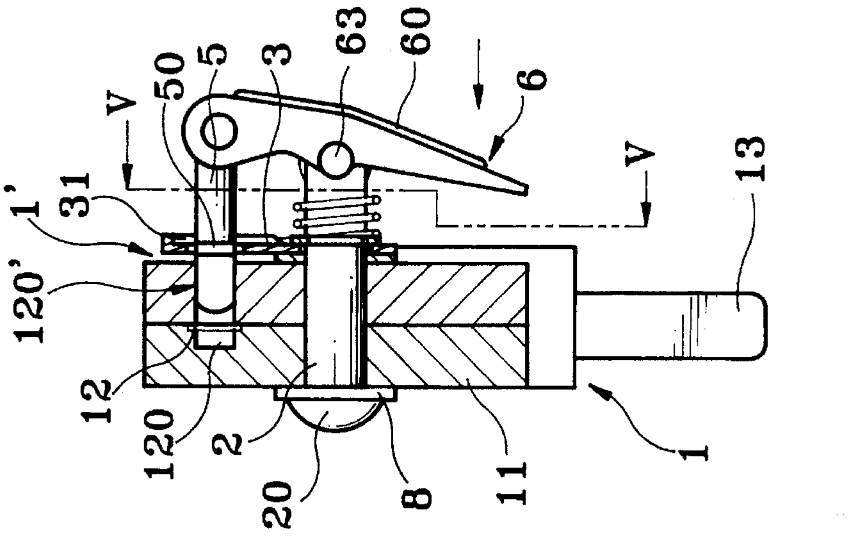
FIG. 3B is similar to FIG. 3A but showing the lever depressed.
Figure 3A:
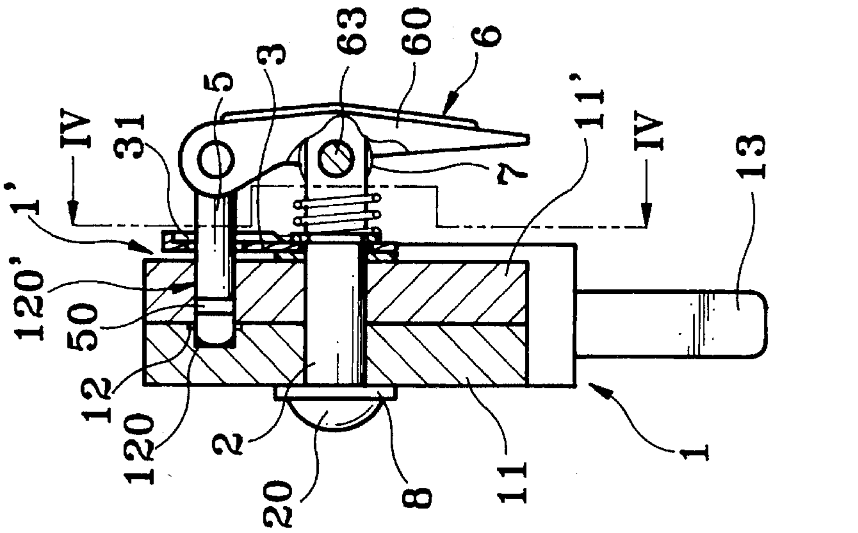
FIG. 3A is a side view in section of the joint shown in FIG. 2.

The operation of the joint is outlined hereinafter with reference to FIGS. 3A, 3B, 4, 5, 6, and 7. When the 1ever 6 is not depressed, as shown in FIG. 3A, the locking rod 5 is inserted through the eccentric through hole 120' on the coupling disk 11' of the second base plate 1' and fitted into one eccentric blind hole 120 on the coupling disk 11 of the first base plate 1, the locating plate 3 is forced rightwards by the first torsional spring 4 (see FIG. 4), causing the locking rod 5 to abut against the periphery of the mounting hole 30 of the locating plate 3. As illustrated in FIG. 3A, the second torsional spring 7. Provides bias to the lever 6, causing the lever 6 to force the locking rod 5 leftwards toward the coupling disk 11 of the first base plate 1. When the lever 6 is depressed, as shown in FIG. 3B, the locking rod 5 is pulled out of the respective eccentric blind hole 120 on the coupling disk 11 of the first base plate 1 and the retaining slot 50 of the locking rod 5 is simultaneously moved out of the eccentric through hole 120' on the coupling disk 11' of the second base plate 1' into engagement with the periphery of the mounting hole 30 of the locating plate 3 (see FIG. 5). Thus the locking rod 5 is locked outside the coupling disk 11 of the first base plate 1 by the locating plate 3 for permitting the second base plate 1' to be turned about the pivot shaft 2 relative to the first base plate 1 (see FIG. 6). When the second base plate 1' is turned to the desired angular position relative to the first base plate 1', the locating plate 3 is moved back by manually engaging the finger strip 31, thus releasing locking rod 5 and permitting the locking rod 5 to be biased by the second torsional spring 7 into the selected eccentric blind hole 120, and therefore lock the joint in the adjusted position.

Figure 8:
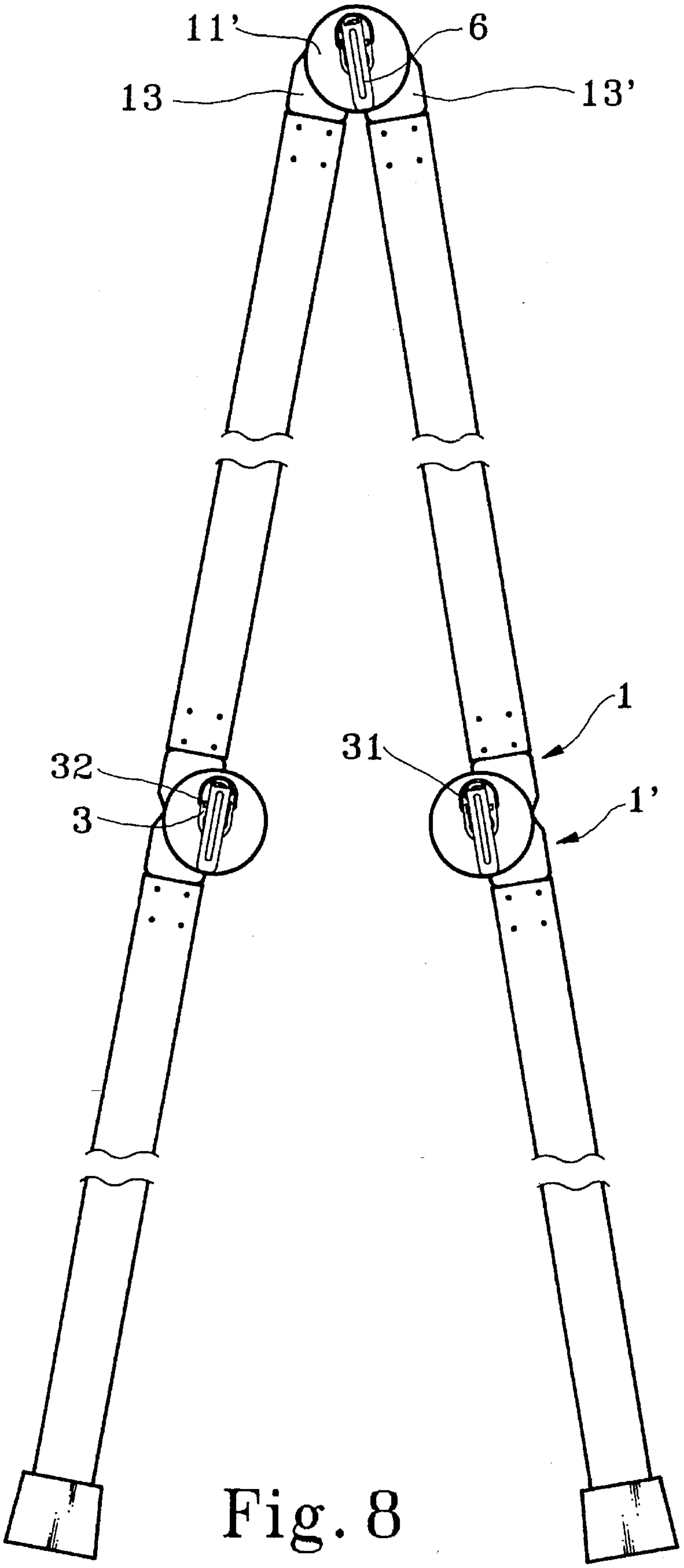
FIG. 8 is an elevational view showing a folding collapsible ladder incorporating the present invention.

FIG. 8 shows a folding collapsible incorporating the joint to the present invention in which, two joints are provided to permit the ladder sections to be conveniently collapsed or turned to the desired angle.

I claim:

1. An adjustable joint assembly for ladder sections comprising:

a) a pivot shaft;

b) a first base plate and a second base plate pivotally mounted on the pivot shaft, the first base plate including a plurality of eccentric blind holes formed therein and the second base plate including an eccentric hole formed therethrough;

c) a locking rod having a retaining slot formed therein, the locking rod extending through the eccentric hole of the second base plate for selective engagement with any one of the plurality of blind holes of the first base plate for maintaining the second base plate at a desired angle relative to the first base plate;

d) a lever pivotally mounted to the pivot shaft and the locking rod, the lever being disposable between a locked position wherein the locking rod engages a blind hole of the first base plate for maintaining the second base plate at the desired angle relative to the first base plate and an unlocked position wherein the locking rod is disengaged from the blind hole to permit the second base plate to be pivoted relative to the first base plate;

e) a locating plate carried by the pivot shaft, the locating plate including a mounting hole having a peripheral edge, a finger strip for manual engagement by a user and a flange adjacent the mounting hole, the locating rod being loosely coupled to the locating plate through the mounting hole;

f) a torsional spring including a first end and a second end, the first end being disposed in engagement with pivot shaft and the second end being disposed in engagement with the flange of the locating plate for biasing the peripheral edge of the mounting hole against the locating rod; and g) whereby when the lever is disposed in the unlocked position, the peripheral edge of the mounting hole engages the retaining slot of the locating rod to maintain the lever in the unlocked position until manual engagement of the finger strip by the user to release the peripheral edge of the mounting hole from the retaining slot after adjustment of the desired angle between the base plates has been accomplished.

* * * * *